United States Patent [19]

Frates et al.

[11] Patent Number: 4,485,941

[45] Date of Patent: Dec. 4, 1984

[54] APPARATUS FOR MELTING AND DISPENSING THERMOPLASTIC MATERIAL

[75] Inventors: Paul S. Frates, Lawrenceville; Calvin R. Jameson; Peter J. Petrecca, both of Atlanta; Charles H. Scholl, Duluth, all of Ga.

[73] Assignee: Nordson Corporation, Amherst, Ohio

[21] Appl. No.: 301,523

[22] Filed: Sep. 14, 1981

[51] Int. Cl.³ ............................................. B67D 5/62
[52] U.S. Cl. ................................ 222/146.5; 222/189; 222/318; 222/330
[58] Field of Search ............. 222/74, 146 H, 146 HE, 222/173, 252, 288, 278, 333, 334, 318, 372, 380, 381, 189, 330, 331, 478, 481; 137/543.23; 138/96 T

[56] References Cited

U.S. PATENT DOCUMENTS

| | | | |
|---|---|---|---|
| 1,528,978 | 3/1925 | McClellan | 222/330 X |
| 1,992,736 | 2/1935 | Bronander et al. | 222/318 |
| 2,090,351 | 8/1937 | Heinrich et al. | 137/543.23 X |
| 3,224,590 | 12/1965 | Nord et al. | 210/438 |
| 3,332,581 | 7/1967 | Estabrooks | 222/181 |
| 3,606,073 | 9/1971 | Burke | 138/96 T |
| 3,792,801 | 2/1974 | Baker et al. | 222/146 HE |
| 3,815,788 | 6/1974 | Reighard et al. | 222/146 HE |
| 3,827,603 | 8/1974 | Reighard et al. | 222/146 HE |
| 3,912,630 | 10/1975 | Reighard et al. | 210/130 |
| 3,964,645 | 6/1976 | Scholl | 222/146 HE |
| 3,981,416 | 9/1976 | Scholl | 222/146 R |
| 4,144,986 | 3/1979 | Smith et al. | 222/52 |
| 4,251,192 | 2/1981 | Clark | 417/291 |
| 4,253,803 | 3/1981 | Wormmeester et al. | 417/283 |
| 4,255,093 | 3/1981 | Erikson | 417/310 |

FOREIGN PATENT DOCUMENTS

| | | |
|---|---|---|
| 28071 | 5/1981 | European Pat. Off. |
| 37219 | 10/1981 | European Pat. Off. |
| 1935398 | 7/1969 | Fed. Rep. of Germany |
| 2624267 | 12/1976 | Fed. Rep. of Germany |
| 1486390 | 9/1977 | United Kingdom |

Primary Examiner—Joseph J. Rolla
Assistant Examiner—Michael S. Huppert
Attorney, Agent, or Firm—Wood, Herron & Evans

[57] ABSTRACT

An apparatus for melting and dispensing thermoplastic material comprising a melter tank, a pump contained within the melter tank, a dispenser, and a manifold block mounted on the bottom of the melter tank. Thermoplastic material melted in the tank flows from the melter tank, through the pump, through the manifold block, to the dispenser. The pump is mounted in the tank and is either a reciprocating piston type or a rotary gear type pump, the two being interchangeable upon the tank. If a gear type pump is used, it is provided with a built-in pressure control valve operable to circulate the pump flow back to the tank when the dispenser flow is terminated or when there is greater pump flow than is required at the dispenser. Contained interiorly of the manifold block in the flow path between the pump and the dispenser there is a replaceable filter. This filter is threadedly mounted in the manifold block but assembly is such that upon removal of the filter, molten thermoplastic material cannot contact and clog the filter mounting threads.

10 Claims, 16 Drawing Figures

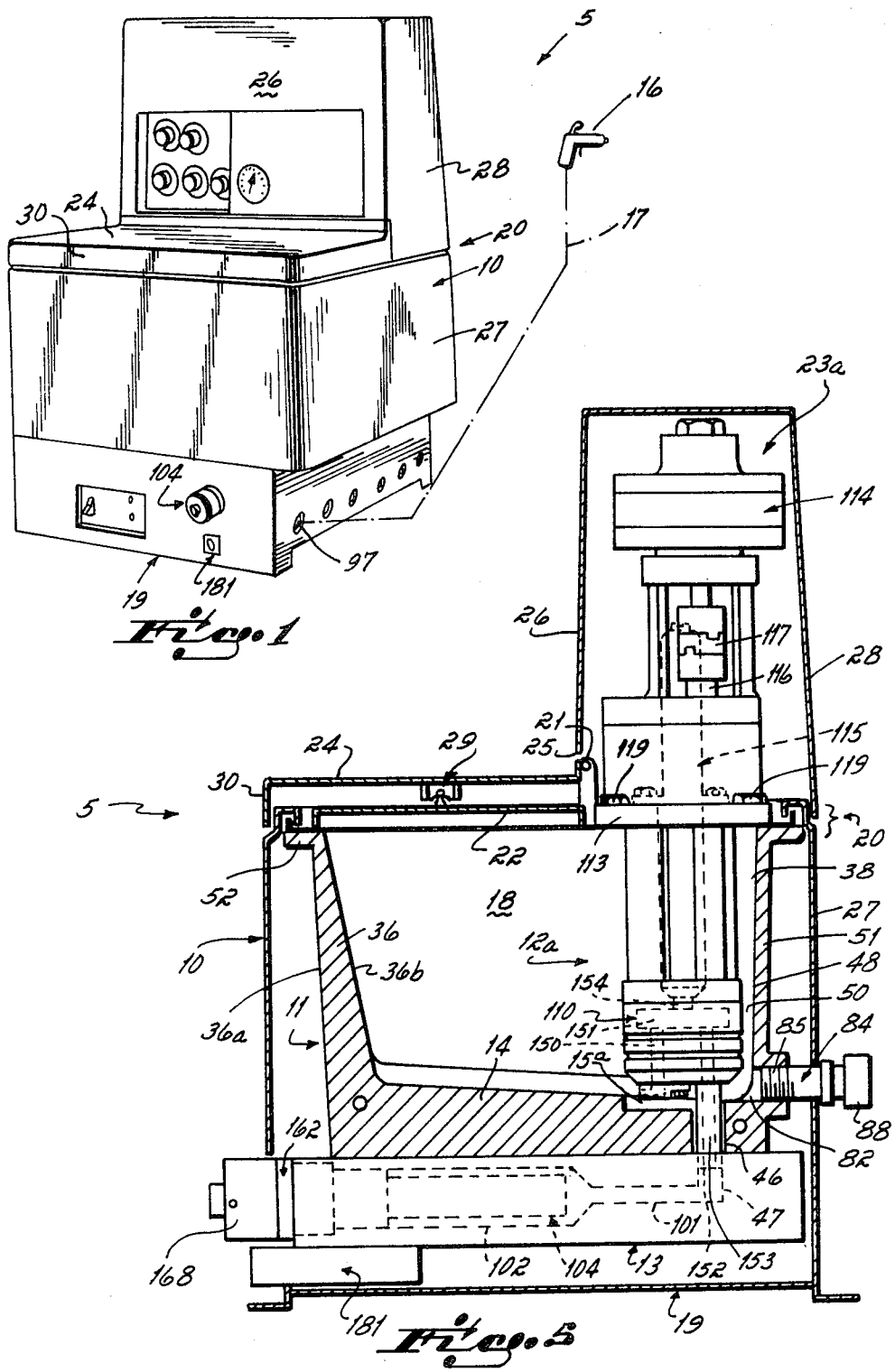

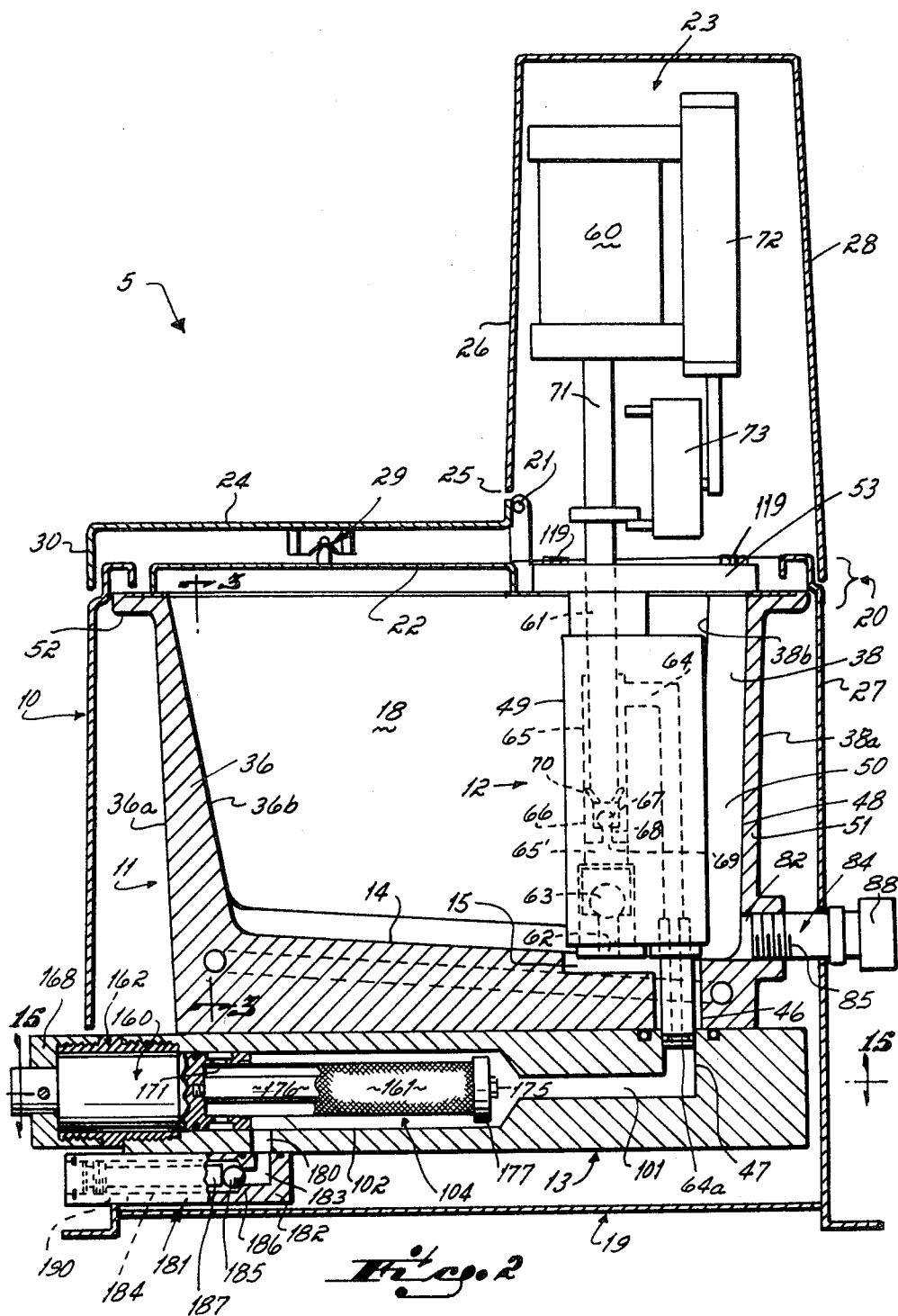

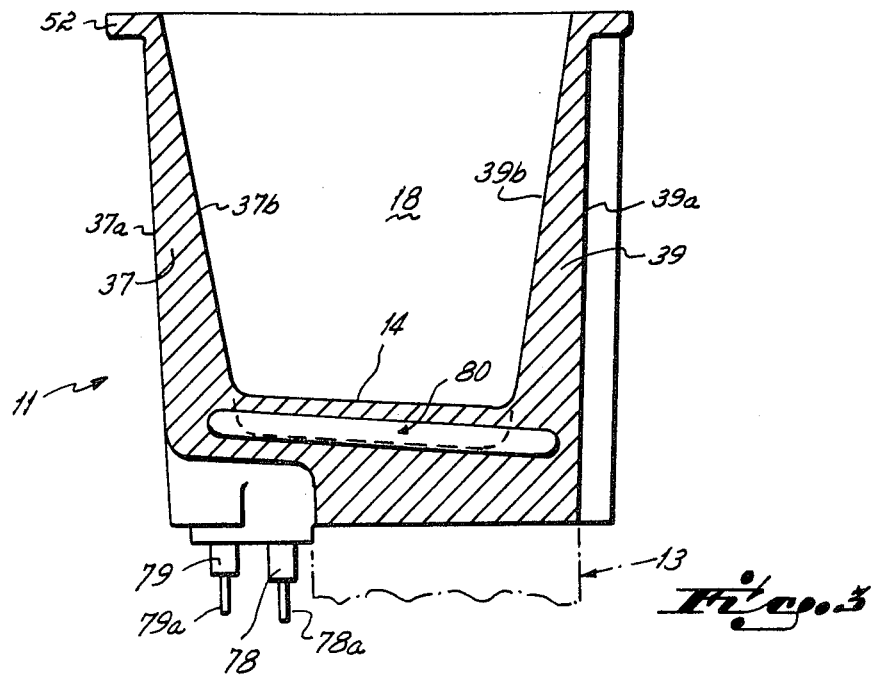
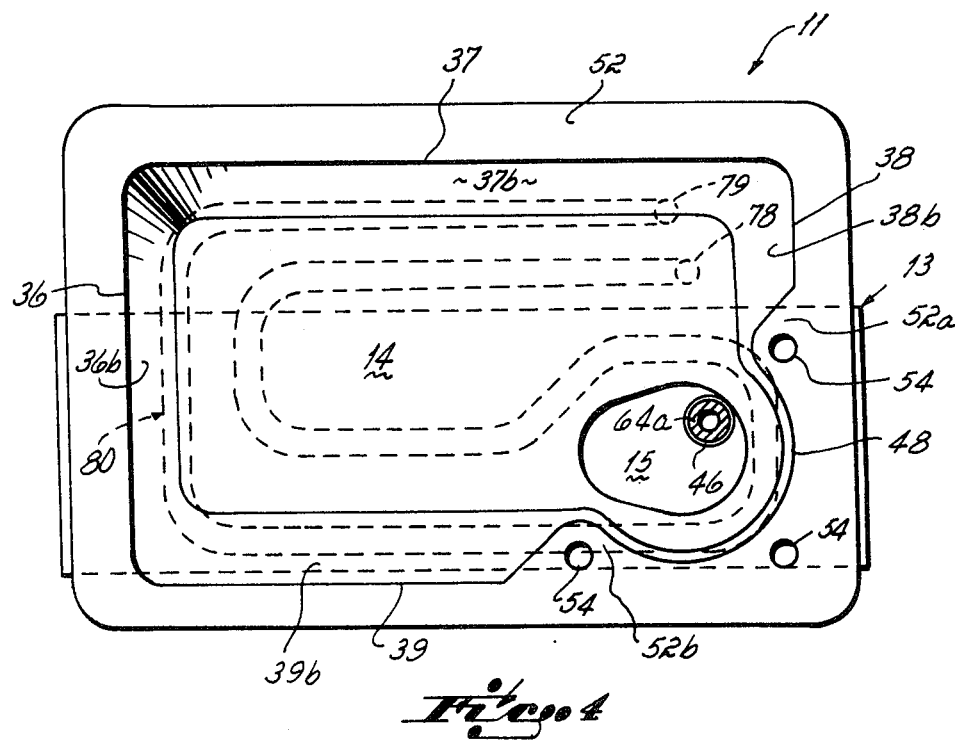

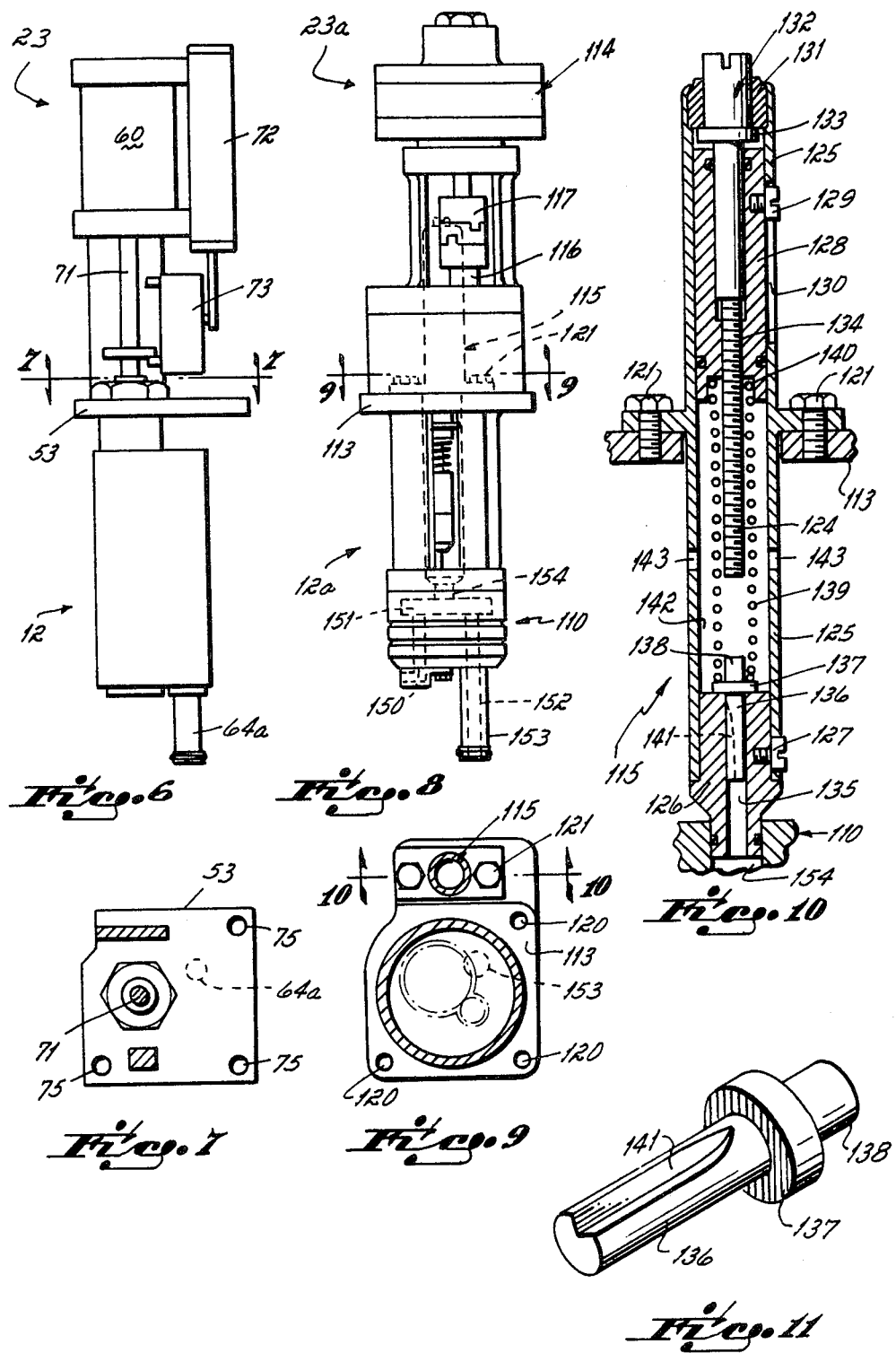

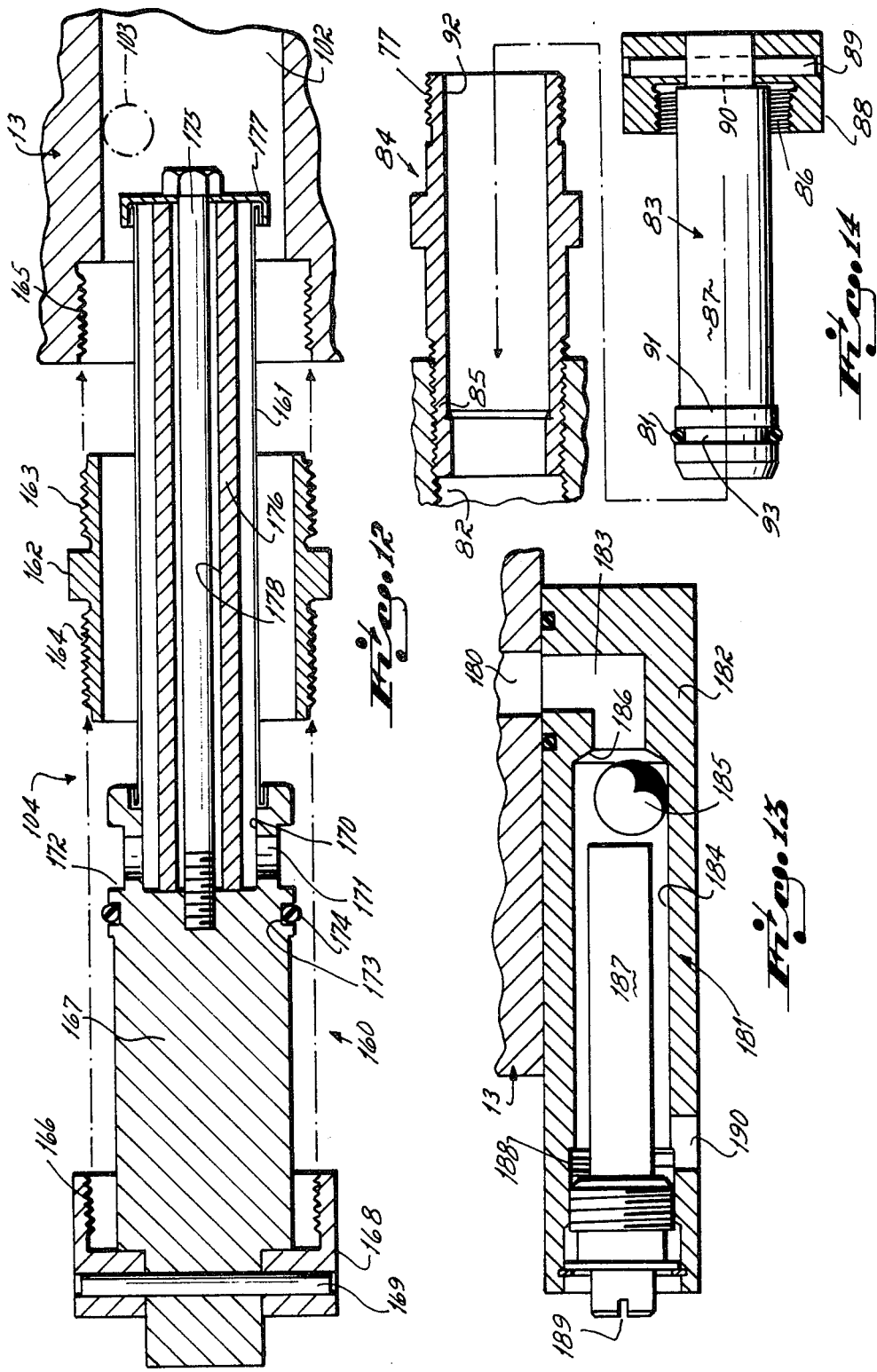

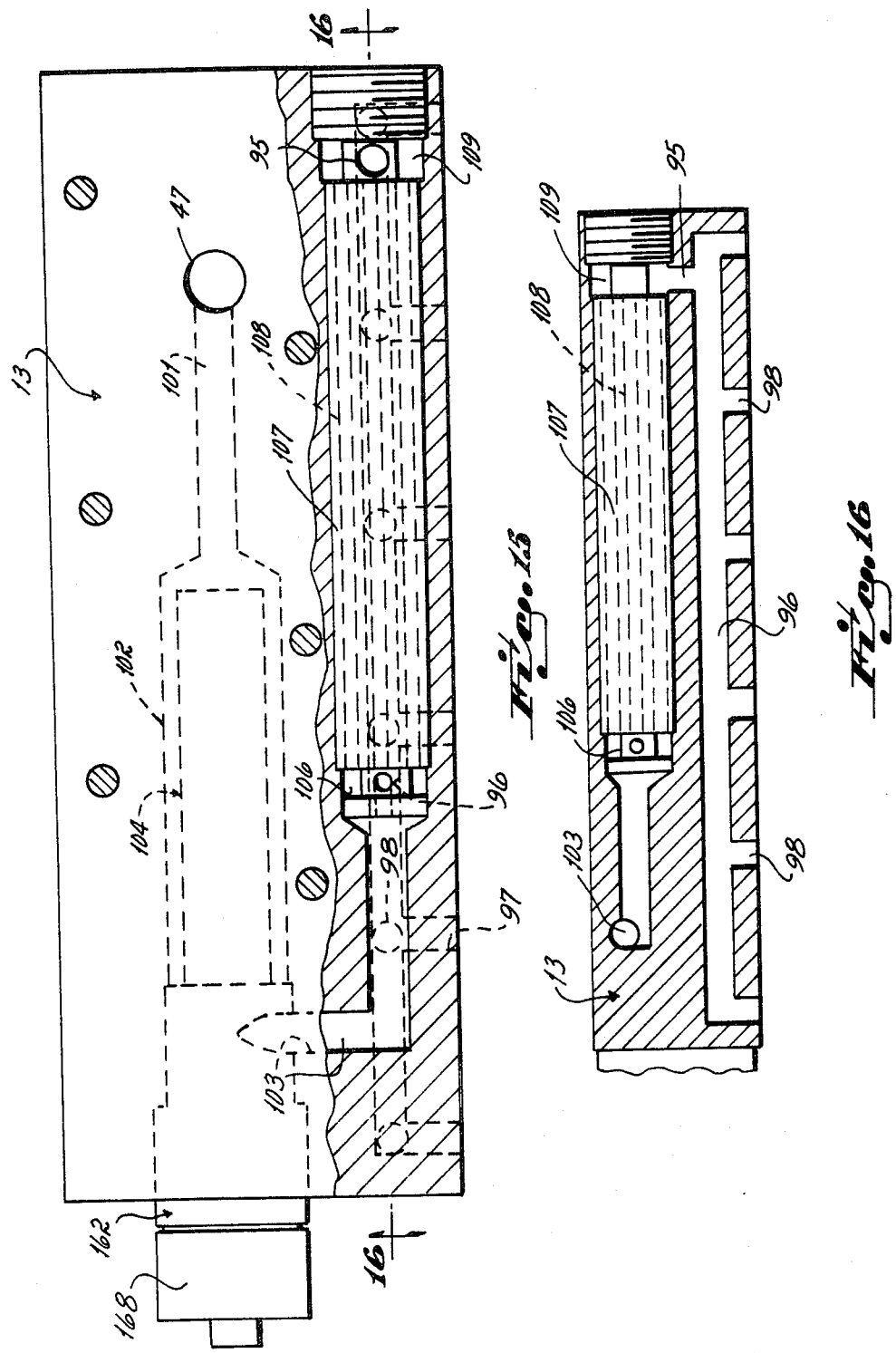

APPARATUS FOR MELTING AND DISPENSING THERMOPLASTIC MATERIAL

This invention relates to apparatus for melting and dispensing thermoplastic material.

Conventionally, thermoplastic materials, or so-called "hot melt" materials, are used as adhesives or sealants. These materials are all characterized by being solid at room temperature and molten at a temperature substantially above room temperature, usually a temperature on the order of 250° F. to 400° F. These materials are all applied in the molten state. Once distributed onto the substrate, the materials are exposed to atmospheric temperature, at which temperature the thermoplastic materials set up or solidify very quickly.

In the past, apparatus for melting the solid thermoplastic materials and converting them to the molten state have generally consisted either of tank type melters, as for example disclosed in U.S. Pat. No. 3,827,603 or of grid type melters, as for example disclosed in U.S. Pat. No. 3,792,801 and U.S. Pat. No. 3,964,645. The grid type melters generally operate upon the principle of supporting the solid thermoplastic material upon the top of a heated open grid, which grid is maintained at a temperature substantially above the melting temperature of the thermoplastic material. The solid material is melted upon contact with this grid and falls through the grid into a relatively small reservoir located beneath the grid. From this reservoir the molten material is pumped to a dispenser. Grid type melters are more efficient than tank type melters but are generally much more expensive because they operate at higher temperatures, subject the molten material to higher temperatures, require greater temperature control, etc.

Tank type melters, as opposed to grid melters, operate upon the principle of utilizing heated walls of a tank to impart sufficient heat to solid thermoplastic material contained within the tank to melt it and convert it to the liquid state. Conventionally, tank type melters utilize a single heating element cast into the bottom wall of the tank to generate the heat required to melt the thermoplastic material.

Irrespective of whether the melter is of the tank or grid type, the molten material melted by the melter must be supplied from the melter to the dispenser. Generally, the dispenser is a valve type gun to which the material is supplied under relatively high pressure and from which the material is dispensed whenever the valve is open. The pressure required to transport the molten material from the melter to the dispenser is conventionally generated by a pump located interiorly of the tank or reservoir. This pump may be of the reciprocating piston type or of the rotary gear type. Certain applications with some thermoplastic materials require the use of a rotary gear type pump and other applications with other adhesives require a reciprocating piston type pump. Some applications permit of either type pump being used, but in general, one style or the other is preferred.

One problem which manufacturers of hot melt dispensing equipment have encountered is that of manufacturing and then inventorying one line of equipment, including melting tanks and pumps for dispensing material which requires the use of rotary piston pumps, and another line of equipment including melting tanks of the type which utilize reciprocating piston pumps. Heretofore, there has never been a single line of equipment which could be used interchangeably with either reciprocating piston or rotary gear type pumps depending upon the choice of materials and applications for the material.

It has therefore been one objective of this invention to provide an improved thermoplastic and melting dispensing apparatus which is sufficiently modular that either a rotary gear pump or a reciprocating piston pump may be substituted interchangeably upon it without any further significant modification of the equipment.

This objective is satisfied and one aspect of this invention is predicated upon the concept of a thermoplastic material melting and dispensing apparatus in which the tank is so constructed that it may interchangeably accept in a common mounting either a reciprocating piston pump or a rotary gear pump. The rotary gear pump is equipped with a pressure control valve operative as a reciprocating valve to return to the tank any molten material pressurized by the pump but not required for use in the gun because of the valve of the gun either being closed or opened to a degree so as to require less than full pump flow. When the reciprocating piston pump is used with the apparatus, there is no need for a circulation valve in the system because the pump simply stalls and maintains the thermoplastic material under pressure whenever the valve of the dispenser is closed.

Another common problem encountered will all thermoplastic material melting and dispensing apparatus concerns the prevention of solid materials passing from the melter tank to the dispenser. One solid which commonly occurs in thermoplastic material is char or residue generated by the material either overheating or being maintained in the molten state for an excessively long period of time. That char or residue must be filtered from the thermoplastic material before it reaches the dispenser or it will clog the valve of the dispenser and eventually cause a failure of the apparatus. To accomplish that filtering of the solid material from the molten thermoplastic material, most "hot melt" systems include a filter mounted in the flow path between the pump and the dispenser. Commonly, this filter is mounted in a manifold attached directly to the melting tank or reservoir of the apparatus. That manifold contains a removable screen type filter through which the material must pass in the course of flowing through the manifold from the pump to the dispenser. Any solids flowing through the manifold are entrapped within a screen of that filter. Periodically, the filter is removed from the manifold and the screen replaced.

The replacement of that filter screen though, has on occasion, created a maintenance problem relative to the use of hot melt systems having replaceable filter screens as a part of the system. Those maintenance problems commonly occur because the screen is generally attached to a plug which is threaded into the manifold block, as for example disclosed in U.S. Pat. No. 3,912,630. To replace the screen all that is required is to unthread the plug from the manifold block, remove the clogged screen from the plug, attach a new screen and rethread the plug and its attached screen back into the manifold. The maintenance problem associated with this apparatus commonly occurs when the plug is removed and a residual supply of molten material contained in the manifold flows out through the now unplugged hole within which the filter had previously been located. That molten material flowing out of the now unplugged hole enters the threads of the hole and becomes desolidified therein. Subsequently, when the plug is to be rethreaded into the hole those filled threads are sufficiently jammed to prevent rethreading of the plug without stripping the threads of the plug or the tapped hole in which the plug is mounted.

It has therefore been another objective of this invention to provide an improved manifold block and filter combination in which the threads within which a filter plug is mounted cannot become stripped by having molten material flow into the threads when the plug is removed for purposes of cleaning and replacing the filter attached to the plug. This objective is accomplished and another aspect of this invention is predicated upon the concept of utilizing an adapter having dual male threaded sections thereon for use between the female threads of the manifold and the male threads of the plug. According to the practice of this aspect of the invention, the plug has female threads thereon adapted to be received over male threads of one end of the adapter and the other end of the adapter has male threads thereon threaded into the female threads of the manifold block. The adapter is never removed during cleaning and replacement of the filter so that the female threads of the manifold are never exposed to thermoplastic material flowing out of the filter chamber when the filter is removed from the manifold block.

Still another problem commonly encountered in the use of thermoplastic melting and dispensing apparatus occurs as a consequence of the apparatus being used in combination with a relatively stiff inflexible hose for connecting the melting section of the apparatus to the dispenser. These hoses quite commonly contain an electrical resistance heating element therein for maintaining the material flowing through the hose in the molten state. Additionally, the hoses are wrapped with insulative material to prevent heat loss and protect persons coming in contact with the hose from being burnt. The result is that the hose is relatively stiff and unwieldy. This stiffness of the hose becomes particularly troublesome when the hose is connected to one side of the melting apparatus and the gun or dispenser is required to be used on the opposite side. In that event the stiff, unwieldy hose must be wrapped completely around the melting apparatus in order to reach the area in which the dispenser is to distribute the material. That wrapping around of the hose requires that it pass through at least two 90° bends which with a particularly stiff hose requires that the hose be very long in order to make those bends or turns. In order to minimize this problem the invention of this application contemplates locating exit ports on the side, rear and the bottom walls of a manifold block through which molten material is distributed from the tank to the hose. These exit ports eliminate one 90° bend in the hose if the hose is to be used on the side of the melter opposite from that upon which the manifold block is mounted.

The melting and dispensing apparatus of this invention which accomplishes these objectives comprises a tank melter, a pump mounted within the melter, a manifold block attached to one side of the melter for receiving thermoplastic material from the pump and for distributing it to a conventional valved type applicator or dispenser. The melter tank of this invention has a pump mounting which is adapted to receive either of two modular, interchangeable pumps, one a reciprocating piston pump and the other a rotary gear pump. The gear pump includes a pressure control valve module, operable as a recirculation valve to direct any overflow or unused flow from the gear pump to the dispenser back to the tank. The manifold block includes a filter chamber located in the flow path between the pump and the dispenser. This filter chamber has a filter attached to a filter plug mounted therein. Between the filter plug and the manifold chamber there is a threaded adapter having male threads on opposite ends for mounting within the manifold block and for reception of the female threads of the filter plug. When the filter plug is removed from the adapter, molten material is free to flow from the adapter without contact with any threaded surfaces of the manifold block or the adapter. The manifold block has exit ports on its exposed side, rear and bottom walls so that hoses connecting it to one or more dispensers may be attached to any of these ports.

The primary advantage of this invention is its adaptability for melting and dispensing a greater variety of thermoplastic materials than has heretofore been possible with a single thermoplastic melting and dispensing system.

These and other objects and advantages of this invention will be more readily apparent from the following description of the drawings in which:

FIG. 1 is a perspective view of a thermoplastic material melting and dispensing apparatus incorporating the invention of this application.

FIG. 2 is a cross sectional view through the apparatus of FIG. 1, the apparatus illustrating a reciprocating piston pump.

FIG. 3 is a cross sectional view through the melter tank taken on line 3—3 of FIG. 2.

FIG. 4 is a top plan view of the melter tank employed in the apparatus.

FIG. 5 is a cross sectional view similar to FIG. 2 but with a rotary gear pump mounted in the melting tank and substituted for the reciprocating piston pump of FIG. 2.

FIG. 6 is a side elevational view of the reciprocating piston pump employed in the use of the apparatus.

FIG. 7 is a cross sectional view taken on line 7—7 of FIG. 6.

FIG. 8 is a side elevational view of the rotary gear pump employed in the use of the apparatus.

FIG. 9 is a cross sectional view taken on line 9—9 of FIG. 8.

FIG. 10 is a cross sectional view of the pressure control circulating valve employed when the rotary gear pump is used in the apparatus, taken on line 10—10 of FIG. 9.

FIG. 11 is a perspective view of a valve shaft employed in the circulating valve of FIG. 10.

FIG. 12 is an exploded cross sectional view of the filter of the apparatus.

FIG. 13 is an enlarged cross sectional view of the filter flush valve of the apparatus, the valve being shown in an open condition.

FIG. 14 is an exploded cross sectional view of the melter tank drain valve.

FIG. 15 is a cross sectional view of the manifold block taken on line 15—15 of FIG. 2.

FIG. 16 is a cross sectional view taken on line 16—16 of FIG. 15.

Referring first to FIGS. 1, 2 and 5 it will be seen that the thermoplastic material melting and dispensing apparatus 5 of this invention comprises a housing 10 within which there is located a tank melter 11, a reciprocating piston pump 12, and a manifold block 13. Solid thermoplastic material in the form of chunks, pellets, or blocks are placed in the melter tank 11 where they are melted and from which they flow via a sloping bottom wall 14 toward a recess or pump inlet 15 for the reciprocating piston pump 12 (FIG. 2) or the inlet 15a for the rotary gear pump 12a (FIG. 5). The pump (either the gear pump or the reciprocating piston pump) then causes the molten material to be supplied under pressure into the manifold block 13 from whence it is directed to one or more conventional applicators or dispensers 16 via hoses or conduits indicated diagrammatically at 17.

Housing

The housing 10 comprises a base 19 and a fiberglass reinforced plastic shroud 20 mounted atop that base. The shroud 20 comprises a base section 27 and a console section 28 mounted atop the base section 27. The base section 27 of the shroud encloses or encases the melter tank 11 while the console section 28 encloses the drive section 23 or 23a of the pump 12 or 12a and selected electrical control components of the control circuits for controlling the temperature of the heated components through the system. The base section 27 of the housing also includes a hinged cover 24 connected to the housing at the upper edge of the side wall 27 by a conventional hinge pin 21. Attached to the inside of the hinged cover there is a lid 22 which covers the open top of the heater tank 11. A snap-fit type connector 29 interconnects the tank lid 22 to hinged cover 24 so that when the cover 24 is opened by lifting the front edge 30 upwardly about the hinge pin 21, the lid 22 is correspondingly moved with the cover so as to expose the interior 18 of the tank 11. Thereby the inside 18 of the tank 11 is exposed so that it may be filled with solid thermoplastic material.

The housing 10 including the hinged cover 24, the lid 22, and the snap-fit connector 29 between the cover 24 and lid 22 per se form no part of the claimed invention of this application and therefore have not been described in greater detail herein.

Melter Tank

The melter tank 11 comprises a metal casting having the bottom wall 14 and four side walls 36, 37, 38 and 39. The tank is open at the top so that solid thermoplastic material may be placed within the top when the cover 24 and the attached tank lid 22 are open.

The side walls 36, 37, 38 and 39 of the tank are all generally triangular in cross sectional configuration as may be seen most clearly in FIGS. 2 and 3. The outer surface 36a, 37a, 38a, and 39a of each wall is located in a nearly vertical plane. The inside surface 36b, 37b, 38b and 39b of each wall slopes downwardly and inwardly with the result that the top edge of each wall is thinner than the bottom edge. This taper of the walls functions to facilitate heat transfer from the base of each wall upwardly. Thus, each side wall acts as a fin to effectively conduct heat upwardly from the heated bottom wall 14 of the tank into thermoplastic material contained within the tank.

The bottom wall 14 of the tank slopes downwardly from the side walls to one corner where the pump inlet or recess 15 receives the bottom of the pump 12 or 12a. This recess 15 is open to a vertical port 46 which extends through the bottom of the tank and is open to a conduit 47 contained with the manifold block 13. As a consequence of the sloping bottom wall of the tank, all molten material within the tank flows downwardly over the tank and ultimately into the recess 15.

With reference to FIGS. 4 and 5 it will be seen that one corner of the melter tank 11 has a vertical recess 48 formed therein which is arcuate in configuration and which is adapted to receive the cylinder of the pump 12 or 12a. A clearance gap 50 between the vertical side wall of the pump cylinder and the arcuate vertical wall 51 of the recess 48 is in open communication with the interior of the tank so that any molten material contained therein flows downwardly and ultimately into the recess 15 in the bottom of the tank.

Extending outwardly from the top edge of each side wall 36, 37, 38, 39 there is a flange 52. As may be seen most clearly in FIG. 4, this flange extends completely about the top edge of the tank. At the corner within which the pump 12 is mounted, the flange 52 has protrusions 52a and 52b extending inwardly over the tank side walls so as to facilitate attachment of a mounting plate 53 or 113 of the pump 12 or 12a.

An electrical heating element in the form of a constant diameter, fixed resistance, heating element 80 is cast into the bottom wall 14 of the tank. This heating element 80 is asymetrically configured within the bottom wall 14 of the tank such that the length of heating element within any single portion of the tank is proportional to the mass of material including the tank, manifold, pump, and thermoplastic material required to be heated by that portion of the tank bottom wall. This configuration thus maximizes the efficiency of the heater element and maintains an even temperature of molten thermoplastic material throughout the tank, manifold, and pump.

With particular reference to FIGS. 3 and 4 it will be seen that ends 78, 79 of the electrical heating element 80 extend from the bottom of the tank and terminate in electrical connectors 78a, 79a. These connectors 78a, 79a are connected to conventional electrical control circuitry (not shown) which controls the supply of electrical power to the heating element 80.

As seen in FIGS. 2 and 14, a drain port 82 is located at the bottom of one side wall of the tank. This port is threaded for the reception of a drain plug 83 and a drain plug adapter 84. This drain plug adapter comprises a sleeve having male threads formed on its opposite ends. The threads 85 at one end of the adapter are threaded into the port 82. The threads at the opposite end are adapted to receive internal threads 86 of the plug 83.

The plug 83 is made in two sections, a central shaft section 87 and a knob section 88. The knob section is pinned to the shaft section 87 by a conventional retaining pin 89 which extends through a transverse bore of the knob and a mating transverse bore 90 in the end of the shaft 87.

The inner end of the shaft 83 has a flange 91 formed thereon and sized so as to be slideable within the bore 92 of the adapter 84. An O-ring is received within an annular groove 93 formed in the periphery of the flange 91. When the plug is inserted into the adapter, this O-ring 81 forms a seal between the bore 92 of the adapter and the flange 91 of the plug thus preventing the migration of molten thermoplastic material into the adapter. The plug is retained within the adapter by the internal threads 86 of the plug being threaded over the external threads 77 of the adapter.

By using the adapter 84 between the drain plug 83 and the drain port 82 of the tank, a common problem is averted. That problem occurs in the absence of the adapter because molten material flowing out of the tank into and over the threads of a drain port tend to fill those threads and solidity therein. Subsequently, when an attempt is made to re-insert the drain plug, those solid thermoplastic material filled threads prevent the plug from being re-inserted and may even become stripped. The use of the adapter sleeve 84 between the plug and drain port avoids any exposed threads coming into contact with the molten material as it flows out of the tank.

Additionally, melter tank 11 is provided in two capacity sizes. All ports and pump mounting structure are identically positioned to allow each tank to be used with the same melting and dispensing apparatus 5 without any modification of the apparatus. The size difference basically involves extending the length of side walls 37 and 39 such that the external dimensions and internal capacities change. Heating element 80 maintains an asymmetrical configuration in both sizes.

Pump

The melting and dispensing apparatus 5 of this invention includes either a reciprocating piston pump 12 (FIG. 2) or a rotary gear pump 12a (FIG. 5) for pumping molten material from the bottom of the tank through the manifold block to the dispensing gun 16. The two pumps are so constructed as to be interchangeable. Thereby, the apparatus 5 is capable of melting and dispensing thermoplastic material which requires a reciprocating piston pump as well as materials which require a gear pump. The apparatus is therefore able to dispense a far greater variety of thermoplastic material for a greater variety of applications than is possible with apparatus which accommodates only a single style of pump.

With reference first to FIG. 2 there is illustrated the reciprocating piston pump 12 utilized in the apparatus 5. This pump 12 is a conventional double acting reciprocating piston pump. A complete description of this pump 12 and the air motor 60 for actuating it may be found in U.S. Pat. No. 3,585,361 for "Supply System for Thermoplastic Materials", which patent issued on June 15, 1971 and is assigned to the assignee of this application. Briefly, it comprises the cylinder 49 having a chamber 65 therein within which a piston 66 is reciprocable. At the lower end of the cylinder 49 there is an inlet 62 which opens into the recess 15 of the melter tank 11. This pump inlet 62 is closed at its upper end by a ball check 63. An outlet passage 64 at the upper end of the cylinder chamber 65 is in fluid communication with the chamber 65 and the passage 47 of the manifold block 13.

With reference now to FIGS. 2, 6 and 7 it will be seen that the pump 12 includes the mounting plate 53 which is fixedly secured to the cylinder 49 of the pump between the cylinder 49 and the air motor 60 for operating the motor. The mounting plate 53 has three vertical bores 75 formed therein at three corners of the mounting plate. These three bores are so spaced as to match three bores 54 which extend through the flange 52 of the melter tank. The pump 12 is mounted upon the tank by simply inserting bolts through the bores 75 of the pump mounting plate 53 and the bores 54 of the melter tank flange 52. Thereby, the plate is fixedly attached to flange 52 of the tank with the cylinder 49 of the pump suspended within the interior of the tank.

In the operation of the pump, when the piston 66 which is attached to the lower end of a piston rod 61 is raised, the volume of chamber 65 above the piston is filled with liquid thermoplastic material. That volume of thermoplastic material is then forced as the piston 66 rises to flow out through the passage 64 at the upper end of the chamber 65. During this upward movement a ball check 67 contained within the piston is held tightly against its seat 68 so that there is no liquid flow from the chamber 65 above the piston through the piston 66 to the lower portion 65' of the chamber located beneath the piston 66. During this upward movement of the piston 66, the lower ball check 63 is lifted upwardly off of its seat in response to the pressure of incoming material seeking to fill the void left by piston 66. When piston 66 has completed its upward stroke, lower chamber 65' is filled with liquid material which has been drawn in on the upward stroke. On the downward stroke of piston 66, ball check 63 seats and remains firmly seated while ball check 67 is moved upwardly on its seat permitting displaced material to move upwardly through piston inlet 69 past ball check 67 and through ports 70 to displace material in the chamber 65 forced outwardly through the outlet conduits 64.

The air motor 60 of the pump comprises a cylinder housing within which a pneumatic piston reciprocates to drive a connecting rod 71 attached to the upper end of the piston rod 61. Air is supplied to the opposite sides of the piston motor under the control of a conventional 4-way valve 72. A complete description of the piston motor 60 and 4-way valve 72 as well as an over-center mechanism 73 for controlling positioning of the valve 72 may be found in the above identified U.S. Pat. No. 3,585,361. Since the operation of the pneumatic piston motor 60, valve 72 and the over-center mechanism 73 is conventional, it has not been illustrated and described in detail herein.

With reference to FIGS. 5, 8 and 9 there is illustrated the rotary gear pump 12a which may be utilized in the apparatus in the event that a particular application calls for a gear pump rather than a reciprocating pump. This gear pump 12a is interchangeable with the pump 12 within the apparatus 5.

The pump 12a comprises a conventional single stage gear pump 110 suspended from a mounting plate 113. Mounted atop the mounting plate 113 there is a drive motor 114 and a circulating valve 115 (illustrated in detail in FIG. 10). The drive motor 114 may be either an electric drive motor or a rotary pneumatic motor. In either event, it is connected to the drive shaft of the pump via an interconnecting drive shaft 116 and coupling 117. The pump 110, drive motor 114, interconnecting drive shaft, and coupling are all conventional and therefore have not been illustrated in detail herein.

The mounting plate 113 has three spaced vertical holes 120 formed therein. These holes are of the same size and spaced in exactly the same manner as are the holes 75 in the mounting plate 53 of the reciprocating piston pump 12. Consequently, the mounting plate 113 may be mounted upon the flange 52 of the melter tank and bolts 119 inserted through the holes 120 of the mounting plate and the holes 54 of the melter tank so as to secure the rotary gear pump to the melter tank.

A circulating valve 115 is attached to the mounting plate 113 by two bolts 121 which extend through a flange of the valve and are threaded into threaded bores of the mounting plate 113. As a consequence of this construction, the complete rotary gear pump including the circulating valve 115, may be removed from the tank 11 for purposes of replacement or repair by simply removing the three bolts 119 or alternatively, the circulating valve 115 may be separately removed for repair while the pump is left intact on the melter tank by simply removing two bolts 121. This construction facilitates replacement or repair of the pump and/or the circulating valve 115.

With reference now to FIG. 10 it will be seen that the circulating valve 115 comprises a sleeve 125, one end of which is enclosed by an end plug 126 fixedly secured to the sleeve by a threaded connector 127 and the opposite end of which is closed by a slideable plug 128. This latter plug 128 has a screw 129 extending from one side wall and slideable within a vertical slot 130 of the sleeve 125.

Swageably mounted in the upper end of the sleeve 125 there is a plug 131. This plug receives the end of an adjustment screw 132 which extends through an axial bore of the plug 131. The adjustment screw has a shoulder 133 entrapped between the inner end of the plug 131 and the upper end of the slideable plug 128. The lower end of the screw is threaded as indicated at 124. The threaded end of the adjustment screw passes through a threaded section 134 of the slideable plug 128 such that rotation of the adjustment screw effects longitudinal displacement of the slideable plug 128 relative to the sleeve 125.

The plug 126 in the lower end of the circulating valve 115 has an axial bore 135 extending therethrough. A valve shaft 136 is slideably mounted within this bore. This valve shaft 136 has a flange 137 located near the upper end of the shaft and adapted to seat on the upper end of the block 126. A post 138 extends upwardly from the flange 137 and serves as a guide for one end of a compression spring 139 mounted over the post 138. The opposite end of the spring 139 is received within a recess 140 in the lower end of the slideable plug 128. This spring 139 biases the valve shaft 136 with its attached flange 137 into a closed position relative to the plug 126.

The valve shaft 136 has a peripheral V-shaped groove 141 (see FIG. 10) which is of increasing cross sectional area from the upper to the lower end. Consequently, as the valve shaft 136 is unseated by being forced upwardly, the cross sectional area of the groove 141 exposed to the chamber 142 of the valve increases, thereby increasing the flow path for fluid flowing upwardly through the bore 136 into the chamber 142 of the sleeve. Fluid which enters the chamber 142 of the valve is free to flow via ports 143 out of the chamber and to flow over the exterior of the sleeve 125 into the interior 18 of the tank 11.

In the operation of the rotary gear pump 12a molten material is pulled upwardly into the pump from the inlet 150 (FIG. 8) into the gear section 151 of the pump. Within that section 151, the molten material is pressurized and forced to exit under high pressure via the internal bore 152 of the pump nozzle 153. This molten material flows under high pressure into the entrance port 47 of the manifold block 13. In the event the valve (not shown) of the dispenser 16 is closed or is only open to such a degree as to permit less than all of the flow from the pump to flow from the dispenser the excess flow is returned to the tank 11 via the circulating valve 115. Thus, excess flow returns to the tank via flow conduits 154 from the high pressure side of the pump to the inlet port 135 of the circulating valve. These flow conduits 154 which interconnect the high pressure side of the pump 12a to the inlet are located within the interior of the gear pump 110 and have only been illustrated diagrammatically in FIG. 8. This excess flow from the high pressure side of the pump 12a to the inlet port 135 of the valve 115 forces the valve shaft 136 upwardly, thereby opening a flow path from the inlet port 135 via groove 141 in the shaft 136 into the interior chamber 142 of the circulating valve.

It will be appreciated that the circulating valve 115 is in fact a pressure control valve operative when the pressure in the inlet port 135 exceeds the setting of the valve to open and permit flow from the inlet port 135 to return to the tank. The pressure at which the valve opens is controlled by the adjustment of the screw 132 which varies the spring pressure biasing the valve to a closed position. Thus, the valve maintains a fixed back pressure on the molten material flowing from the pump 110 to the dispenser 16.

Manifold Block

The manifold block 13 is best illustrated in FIGS. 2, 15 and 16. As may be seen in the figures, the molten material from the pump 12 enters the inlet port 47 of the manifold block from a nozzle extension 64a or 153 of the pump 12 or 12a. The inlet port 47 is connected to a horizontal passageway 101 of the manifold block which communicates with a filter chamber 102 of the block. Within this chamber there is a filter cartridge 104.

The filter cartridge 104 is illustrated in FIG. 12. With reference to this figure, it will be seen that the filter cartridge comprises a filter plug 160 to which there is removably attached a filter screen 161. The plug 160 with its attached screen 161 is mounted within the manifold block by means of an adapter plug or sleeve 162. This adapter is in the form of a sleeve having male threads 163, 164 on its opposite ends. One end having the threads 163 thereon is threaded into the threaded end section 165 of the filter chamber 102 of the manifold block. The other end having the threads 164 thereon receives female threads 166 on the filter plug 160 so as to secure the filter plug to the adapter.

The filter plug 160 comprises a hub section 167 and a knob section 168. The knob section is pinned to the hub section via a retaining pin 169 which extends through a transverse bore of the knob and a transverse bore of the hub so as to secure the two sections together.

The end of the hub 167 remote from the knob is provided with an axial counterbore 170. This counterbore is connected to the hub via transverse ports 171 which open into an annular groove 172 on the periphery of the hub. There is preferably a second annular groove 173 spaced outwardly from the groove 172. An O-ring seal 174 is mounted in this second groove 173. This seal 174 is engageable with the wall of the filter chamber 102 so as to form a seal between the filter plug and the filter chamber 102.

The filter screen 161 is generally cylindrical in configuration and is attached to the hub 167 of the filter plug 160 by means of a long bolt 175, a spacer sleeve 176, and an end cap 177. The bolt 175 extends through the end cap and through an axial bore 178 of the spacer sleeve and is threaded into the end of the hub 167. The cylindrically shaped filter 161 is sandwiched between the end cap 177 and the end of the hub 167.

To assemble the filter cartridge 104 into the filter chamber 102, the filter screen 161 is first assembled onto the hub 160. The adapter plug 162 is threaded into the threaded section 165 of the manifold block 13. Thereafter, the hub 160 is threaded onto the threaded outer end section of the adapter plug so as to secure the filter within the filter chamber 102.

The filter chamber 102 has a drain port 180 (FIGS. 2 and 13) which connects the filter chamber 102 to a flush valve 181. This flush valve is attached to the underside of the manifold block by conventional threaded connectors (not shown). It comprises a flush valve body 182 within which there is a vertical flow passage 183 connected to a horizontal flow passage 184. The vertical flow passage communicates with the drain port 180 of the manifold block.

Mounted within the chamber 184 of the filter flush valve there is a ball 185 engageable with a seat 186 in the end of the chamber. This ball is moved into and out of engagement with the seat 186 by a threaded shaft 187, one end of which is engageable with the ball and the other end of which is threaded into a threaded end section 188 of the body 182. The outer end of the shaft 187 is provided with a screw driver slot 189 so as to facilitate rotation of the shaft 187 by means of a conventional screw driver.

When the shaft 187 is rotated it is caused by the threads 188 to move axially within chamber 184. This axial movement of the shaft causes the ball 185 to be moved into sealed engagement with the seat 186 or to move out of sealed engagement with that seat, depending upon the direction of movement of the shaft 187. So long as the ball 185 is in sealed engagement about the seat 186 molten material is blocked against drainage through the filter flush valve 181. When the ball is unseated, molten material contained in the filter chamber 102 is free to flow via passages 180, 183, 184 through an outlet port 190 of the filter flush valve. Thereby, the filter chamber 102 and filter screen 161 may be flushed of loose contaminates before the filter cartridge 104 is removed from the filter chamber preparatory to cleaning or replacement of the filter screen.

The filter screen of the filter cartridge 104 is operative to entrap any solids and prevent them for passing through the filter cartridge 104 to a transverse filter exit passageway 103. The filter exit passageway is in turn connected to a heat exchanger passage 106 which extends for the length of the manifold block. Within the heat exchanger passage 106 there is a heat exchanger 107 in the form of a heat conductive metal block having multiple longitudinal passages 108. These passages 108 extend for the length of the heat exchanger and open into an end chamber 109 which is connected by a conduit or bore 95 with an outlet passage 96 of the manifold block. Multiple outlet ports 97 in the side wall of the manifold and multiple outer ports 98 in the bottom of the manifold block are in fluid communication with this outlet passage 96 such that the hoses 17 or other conduits may be connected to the outlet ports so as to connect those ports with conventional hot melt dispensers or guns 16.

The ports in the bottom of the manifold block enable the hoses 17 to the dispensers 16 to be connected alternatively to either the ports 97 in the side wall or the ports 98 in the bottom wall. The purpose of the bottom ports 98 is to enable a shorter hose to be employed than would otherwise be required if the dispenser is to be located on the side of the apparatus 5 opposite from the side on which the manifold block is mounted. In general, the hoses 17 are relatively stiff and heavy because they include metal cable, electrical conduits, and electrical as well as thermal insulative materials. Because of this stiffness the hoses, while flexible, cannot be sharply bent. Therefore, two 90° bends in the hose such as would be required if the hose is to be wrapped around the apparatus 5 and used on the side opposite from the manifold block requires a substantially longer hose than is required if the hose is connected to one of the ports 98 in the bottom of the manifold block and passed under the apparatus. Thus, the provision of the ports in the bottom of the manifold block as well as the side adds a degree of flexibility to the apparatus which may on occasion result in a substantially shorter length of hose being used for a particular application.

Operation

In the operation of the melting and dispensing apparatus 5 of this invention, an operating cycle is initiated by lifting of the hinged cover 24 upwardly together with the attached lid 22 so as to expose the open top of the tank 11. Solid thermoplastic material or so-called hot melt material in the form of chunks, pellets or blocks are then dumped into the tank 11 and the cover 24 closed. Electrical power to the heating element 80 is then turned on via a conventional electrical switch on the front of the housing. The heating element 80 then functions to heat the bottom and side walls of the melter tank 11 to a temperature controlled by a thermostat (not shown) at which temperature the solid thermoplastic material contained within the tank melts and converts to the molten state. That molten material then flows downwardly into the recess 15 at the bottom of the tank from which it is pumped by the piston pump 12 or the gear pump 12a through the pump outlet passage 64 into the inlet port 47 of the manifold block 13. From that inlet port the molten material flows under pressure through the filter chamber 102, the filter cartridge 104 into the heat exchanger passage 106. After passage through the heat exchanger 107, the molten material flows into the outlet passage 96 of the manifold block to the outlet ports 97, 98 from which the molten material is flowed via hoses or conduits 17 to conventional dispensers 16.

While we have described only a single preferred embodiment of our invention, persons skilled in the art to which it pertains will appreciate changes and modifications which may be made without departing from the spirit of our invention. Therefore, we do not intend to be limited except by the scope of the following appended claims.

We claim:

1. Apparatus for melting solid thermoplastic material and for supplying the molten thermoplastic material to a dispenser, said apparatus comprising a melter tank, said tank including a bottom wall and side walls extending upwardly from said bottom wall and electrical resistance heating means mounted within said bottom wall of said melter tank, pump mounting means on the top of said tank for mounting a pump from the top of said melter tank with its pump inlet located within said melter tank, a rotary gear pump, said rotary gear pump having a flange secured to said pump mounting means on the top of said tank, said rotary gear pump including a circulating valve, said circulating valve being operable to return to the melter tank all flow from said rotary gear pump which exceeds the flow requirements of said dispenser, and said circulating valve including a flange secured to the top of said flange of said rotary gear pump so as to enable said circulating valve to be removed from said pump mounting means along with said rotary gear pump or to be removed from said rotary gear pump while said rotary gear pump remains attached to said pump mounting means.

2. Apparatus for melting solid thermoplastic material and for supplying the molten thermoplastic material to a dispenser, said apparatus comprising a melter tank, said tank including a bottom wall and side walls extending upwardly from said bottom wall and electrical resistance heating means mounted within said bottom wall of said melter tank, pump mounting means on the top of said tank for mounting a pump from the top of said melter tank with its pump inlet located within said melter tank, said pump mounting means being adapted to receive either of a pair of interchangeable pumps, one of said pair of interchangeable pumps being a reciprocating piston pump and the other pump being a rotary gear pump, said rotary gear pump having a flange adapted to be secured to said pump mounting means on the top of said tank, said rotary gear pump including a circulating valve, said circulating valve being operable to return to the melter tank all flow from said rotary gear pump which exceeds the flow requirements of said dispenser, and said circulating valve including a flange for removably attaching said circulating valve to the top of said flange of said rotary gear pump so as to enable said circulating valve to be removed from said pump mounting means along with said rotary gear pump or to be removed from said rotary gear pump while said rotary gear pump remains attached to said pump mounting means.

3. The apparatus of claim 2 in which said circulating valve includes pressure control means for maintaining a preset back pressure on the molten adhesive supplied to said dispenser.

4. The apparatus of claim 3 in which pressure control means includes a valve spring biased into engagement with a valve seat.

5. The apparatus of claim 4 in which said pressure control means includes means for adjusting the force with which said valve is biased into engagement with said valve seat.

6. The apparatus of claim 5 in which said valve has a variable size orifice formed therein.

7. The apparatus of claim 6 in which said variable size orifice is in the form of a V-shaped groove in said valve.

8. Apparatus for melting solid thermoplastic material and for supplying the molten thermoplastic material to a dispenser; said apparatus comprising a melter tank, said tank including a bottom wall and side walls extending upwardly from said bottom wall and an electrical resistance heating means mounted within said bottom wall of said melter tank, a pump, means for mounting said pump with the pump inlet located within said melter tank, a manifold block, conduit means contained within said manifold block for receiving molten thermoplastic material from said pump and for transmitting it to said dispenser, said conduit means including a filter chamber open to the exterior of said manifold block, a section of said filter chamber being internally threaded, an adapter plug having external threads formed on its opposite ends, the external threads on one end being threaded into said internal threads of said filter chamber, said adapter plug having an axial bore extending therethrough, and a removable filter cartridge including a filter screen mounted within said filter chamber of said manifold block, said filter cartridge including a filter plug having an internally threaded section threaded over the external threads on the opposite end of said adapter plug.

9. The apparatus of claim 8 in which said filter screen is cylindrical in configuration and is replaceably attached to said filter plug.

10. The apparatus of claim 9 in which said filter cartridge includes a spacer sleeve located within said filter screen, an end cap over one end of said filter screen, and a bolt extending through said end cap and through said spacer sleeve, and said bolt being threaded into one end of said filter plug.

* * * * *

UNITED STATES PATENT AND TRADEMARK OFFICE
CERTIFICATE OF CORRECTION

PATENT NO. : 4,485,941

DATED : Dec. 4, 1984

INVENTOR(S) : Paul S. Frates, et al

It is certified that error appears in the above-identified patent and that said Letters Patent is hereby corrected as shown below:

Column 2, line 19, "reciprocating" should be -- recirculation --

Column 3, line 1, "desolidified" should be -- solidified --

Signed and Sealed this

Eighteenth Day of June 1985

[SEAL]

Attest:

DONALD J. QUIGG

Attesting Officer   Acting Commissioner of Patents and Trademarks